(12) United States Patent
Negishi et al.

(10) Patent No.: US 7,219,002 B2
(45) Date of Patent: May 15, 2007

(54) CONTROL APPARATUS FOR INTERNAL COMBUSTION ENGINE

(75) Inventors: Akiyoshi Negishi, Nishikamo-gun (JP); Kazuya Kibe, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/440,111

(22) Filed: May 25, 2006

(65) Prior Publication Data
US 2006/0266033 A1 Nov. 30, 2006

(30) Foreign Application Priority Data
May 30, 2005 (JP) ............................. 2005-157845

(51) Int. Cl.
*F02D 41/00* (2006.01)
(52) U.S. Cl. ......................................... 701/103; 60/601
(58) Field of Classification Search ................ 701/103, 701/102, 105; 60/601–603, 60
See application file for complete search history.

(56) References Cited
U.S. PATENT DOCUMENTS
4,603,552 A * 8/1986 Kido ........................... 123/481

FOREIGN PATENT DOCUMENTS

| JP | 60-209632 A | * | 10/1985 |
|---|---|---|---|
| JP | 6-42359 | | 2/1994 |
| JP | 2001-3796 | | 1/2001 |
| JP | 2002-21613 | | 1/2002 |
| JP | 2003-21000 | | 1/2003 |

* cited by examiner

*Primary Examiner*—Hieu T. Vo
(74) *Attorney, Agent, or Firm*—Oblon, Spivak, McClelland, Maier & Neustadt, P.C.

(57) ABSTRACT

An intake air pressure P1 and a target control value S1 under the condition that the internal combustion engine is in a steady operating state and the condition that the turbocharger has its supercharging efficiency set to a ratio according to the engine operating state are estimated based on engine parameters, and an intake air pressure P2 and a target control value S2 under the condition that the internal combustion engine is in the steady operating state and the condition without supercharging by the turbocharger are estimated based on the engine parameters. A target control value S0 associated with an actual intake air pressure P0 under the condition that the internal combustion engine is in a transient operating state is calculated by performing interpolation on the target control values S1, S2 based on a relation between the intake air pressures P1, P2 and the actual intake air pressure P0.

10 Claims, 5 Drawing Sheets

CONTROL APPARATUS FOR INTERNAL COMBUSTION ENGINE

This nonprovisional application is based on Japanese Patent Application No. 2005-157845 filed with the Japan Patent Office on May 30, 2005, the entire contents of which are hereby incorporated by reference.

BACKGROUND OF THE INVENTION

1. Field of the Invention

The present invention relates to a control apparatus for an internal combustion engine having an exhaust-driven turbocharger.

2. Description of the Background Art

Control of the internal combustion engine (engine control) is performed by adjusting for example such an engine control variable as fuel injection timing based on such engine parameters as accelerator pedal position and engine speed. As a target control value of the engine control variable used for the engine control, basically a value appropriate for a steady operating state of the internal combustion engine is set.

One type of the internal combustion engine is an internal combustion engine having an exhaust-driven turbocharger operated using the force of exhaust flow. A change in quantity of intake air of the internal combustion engine involves a predetermined delay in response for the following reason. When the operating state of the internal combustion engine is changed, the quantity of exhaust is changed first. Then, the change in quantity of exhaust causes a change in state of supercharging by the turbocharger and accordingly causes a change in intake air quantity. Therefore, when the operating state of the internal combustion engine in a steady operating state is changed, the internal combustion engine enters a transient operating state in which there is a difference between an intake air quantity appropriate for the above-described engine parameters and an actual intake air quantity. Then, after a predetermined period of time, the internal combustion engine enters the steady operating state again.

While the internal combustion engine is in such a transient operating state, even if the engine control variable is simply adjusted based on the engine parameters, the adjusted engine control variable is not appropriate for the actual intake air quantity, resulting in various disadvantages such as deterioration in emission properties and an increase in combustion noise.

Thus, it has been proposed to adjust the engine control variable while making corrections according to a difference between a target intake air quantity and an actual intake air quantity for engine control, as done by the apparatus disclosed in Japanese Patent Laying-Open No. 2002-021613. While the internal combustion engine is in the transient operating state, this apparatus uses a correction factor which is determined according to the degree of the above-described difference in intake air quantity to correct the engine control variable, and accordingly prevent the aforementioned disadvantages from being caused.

It should be noted that, even in the case where the above-described difference in intake air quantity is the same, the correction factor determined according to the difference is not always the same. The correction factor varies depending on the engine operating conditions including for example fuel injection quantity and intake air quantity at the time. Therefore, even if the engine control variable is simply adjusted in the manner according to the deviation, namely the degree of the difference in intake air quantity as described above, the aforementioned disadvantages cannot appropriately be avoided. In this respect, the conventional apparatus still requires improvements.

SUMMARY OF THE INVENTION

The present invention has been made in view of the circumstances as described above. An object of the present invention is to provide a control apparatus for an internal combustion engine that can more appropriately adjust the engine control variable in the transient operating state.

In the following, a structure for achieving this object as well as functions and effects thereof are described.

According to the present invention, a control apparatus for an internal combustion engine includes: an estimation unit estimating, based on engine parameters, an intake-air-pressure index value and an engine control variable under the condition that the internal combustion engine is in a steady operating state and the condition that an exhaust-driven turbocharger has its supercharging efficiency equal to a first predetermined ratio and estimating, based on the engine parameters, an intake-air-pressure index value and an engine control variable under the condition that the internal combustion engine is in the steady operating state and the condition that the exhaust-driven turbocharger has its supercharging efficiency equal to a second predetermined ratio; a detection unit detecting an actual intake-air-pressure index value; and a calculation unit calculating an engine control variable associated with the actual intake-air-pressure index value under the condition that the internal combustion engine is in a transient operating state, by performing interpolation on the engine control variables, based on a relation between the intake-air-pressure index values each as estimated and the actual intake-air-pressure index value as detected.

Regarding this structure, it is supposed that there are two assumed states where respective supercharging efficiencies are different from each other. An intake-air-pressure index value and an engine control variable in each of the states are estimated based on engine parameters. An engine control variable under the condition that the internal combustion engine is in the transient operating state is calculated by performing interpolation on the engine control variables as estimated, based on the relation between the estimated intake-air-pressure index values and the actual intake-air-pressure index value. In other words, engine control variables under the condition that the internal combustion engine is in the steady operating state are corrected in the manner according to the difference between the intake air quantities appropriate for the engine parameters and the actual intake air quantity and according to the engine parameters, so as to calculate the engine control variable under the condition that the internal combustion engine is in the transient operating state. Therefore, with this structure, in the case where the internal combustion engine enters the transient operating state, the engine control variable can be calculated in the manner according to the difference between engine control variables appropriate for the steady operating state and the engine control variable appropriate for the actual operating state resultant from the difference in intake air quantity as described above. Accordingly, as compared with the structure calculating the engine control variable based on only the above-described difference in intake air quantity, the engine control variable can appropriately be adjusted.

The intake-air-pressure index value includes, in addition to the intake air pressure itself, such a quantity as the intake air quantity that changes in relation to the intake air pressure.

Preferably, the condition that the supercharging efficiency is equal to the first predetermined ratio refers to the condition that the supercharging efficiency is set to a ratio according to an engine operating state.

With this structure, in the case where the actual intake-air-pressure index value increases as the supercharging efficiency increases and the operating state changes from the transient operating state to the steady operating state to allow the actual intake-air-pressure index value to be equal to the intake-air-pressure index value according to the engine operating state, the engine control variable in the transient operating state can properly be calculated in the manner according to the actual intake air quantity.

Still preferably, the condition that the supercharging efficiency is equal to the second predetermined ratio refers to the condition without supercharging by the exhaust-driven turbocharger.

With this structure, in the case where the actual intake-air-pressure index value decreases as the supercharging efficiency decreases and the operating state changes from the transient operating state to the steady operating state to allow the actual intake-air-pressure index value to be equal to the intake-air-pressure index value associated with the state where supercharging by the exhaust-driven turbocharger is not performed, the engine control variable in the transient operating state can properly be calculated in the manner according to the actual intake air quantity.

Still preferably, an engine control variable "S0" that satisfies the following relational expressions: "S0=S2+(S1−S2)·α·K" and "K=(P0−P2)/(P1−P2)" can be calculated, where "P1" and "S1" are the intake-air-pressure index value and the engine control variable respectively under the condition that the supercharging efficiency is equal to the first predetermined ratio, "P2" and "S2" are the intake-air-pressure index value and the engine control variable respectively under the condition that the supercharging efficiency is equal to the second predetermined ratio, "P0" is the actual intake-air-pressure index value, "S0" is the engine control variable under the condition that the internal combustion engine is in the transient operating state, and "α" is a predetermined factor.

Still preferably, an engine control variable "S0" that satisfies the relational expression: "(P0−P2)/(P1−P2)=(S0−S2)/(S1−S2)" can be calculated, where "P1" and "S1" are the intake-air-pressure index value and the engine control variable respectively under the condition that the supercharging efficiency is equal to the first predetermined ratio, "P2" and "S2" are the intake-air-pressure index value and the engine control variable respectively under the condition that the supercharging efficiency is equal to the second predetermined ratio, "P0" is the actual intake-air-pressure index value, "S0" is the engine control variable under the condition that the internal combustion engine is in the transient operating state.

With this structure, as the engine control variable for the transient operating state, a variable is determined that allows the relation between the estimated intake-air-pressure index values and the actual intake-air-pressure index value to be identical to the relation between the estimated engine control variables and the engine control variable for the transient operating state. Therefore, the engine control variable can appropriately be calculated in the manner according to the difference in engine control variable resultant from the above-described difference in intake air quantity.

Still preferably, the control apparatus further includes a fuel injection mechanism injecting fuel from a fuel injection valve connected to an accumulator pipe while adjusting a fuel pressure in the accumulator pipe, and the engine control variable is the fuel pressure.

In the fuel injection mechanism adjusting the fuel pressure in the accumulator pipe connected to the fuel injection valve, if there arises a difference between the fuel pressure and a fuel pressure appropriate for the current conditions due to a delay in change of the intake air quantity under the condition that the internal combustion engine is in the transient operating state, the fuel injection quantity from the fuel injection valve changes to cause such disadvantages as deterioration in emission properties and an increase in combustion noise. In this respect, with this structure, the fuel pressure in the accumulator pipe can appropriately be adjusted according to the actual intake air quantity and accordingly the disadvantages in the transient operating state of the internal combustion engine can suitably be prevented from occurring.

Still preferably, the control apparatus further includes a fuel injection mechanism performing fuel injection divided into main injection and its preceding pilot injection, and the engine control variable is an interval at which the pilot injection and the main injection are performed.

In the fuel injection mechanism performing the main injection and its preceding pilot injection, if there arises a difference between the interval at which the pilot injection and the main injection are performed and the interval appropriate for the current conditions due to a delay in change of the intake air quantity under the condition that the internal combustion engine is in the transient operating state, combustion becomes unstable to cause such a disadvantage as deterioration in emission properties and such a disadvantage as an increase in combustion noise due to excessively high combustion rate. In this respect, with this structure, the interval can appropriately be adjusted according to the actual intake air quantity and accordingly the disadvantages in the transient operating state of the internal combustion engine can suitably be prevented from occurring.

Still preferably, the control apparatus further includes a fuel injection mechanism performing fuel injection divided into main injection and its preceding pilot injection, and the engine control variable is a fuel injection quantity in the pilot injection.

In the fuel injection mechanism performing the main injection and its preceding pilot injection, if there arises a difference between the fuel injection quantity in the pilot injection and the fuel injection quantity appropriate for the current conditions due to a delay in change of the intake air quantity under the condition that the internal combustion engine is in the transient operating state, combustion becomes unstable to cause such disadvantages as deterioration in emission properties and an increase in combustion noise. In this respect, with this structure, the fuel injection quantity in the pilot injection can appropriately be adjusted according to the actual intake air quantity and accordingly the disadvantages in the transient operating state of the internal combustion engine can suitably be prevented from occurring.

Still preferably, the engine control variable is a fuel injection timing of the internal combustion engine.

In the fuel injection mechanism performing fuel injection while adjusting the fuel injection timing, if there arises a difference between the fuel injection timing and the fuel injection timing that is appropriate for the current conditions due to a delay in change of the intake air quantity under the condition that the internal combustion engine is in the transient operating state, such a disadvantage could be caused as deterioration in emission properties due to unstable combustion and such a disadvantage could be caused as an increase in combustion noise due to excessively high combustion rate. In this respect, with this structure, the fuel injection timing can appropriately be adjusted according to the actual intake air quantity and accordingly the disadvantages in the transient operating state of the internal combustion engine can suitably be prevented from occurring.

Still preferably, the control apparatus further includes an exhaust gas recirculation mechanism recirculating exhaust gas in an engine exhaust manifold to an engine intake manifold while adjusting the quantity of the exhaust gas. The engine control variable is a quantity of the recirculated exhaust gas.

In the exhaust gas recirculation mechanism recirculating the exhaust gas in the engine exhaust manifold to the engine intake manifold while adjusting the quantity of the exhaust gas, if there arises a difference between the exhaust-gas recirculation quantity and the actual exhaust-gas recirculation quantity appropriate for current conditions due to a delay in change of the intake air quantity under the condition that the internal combustion engine is in the transient operating state, the actual intake air quantity changes to cause combustion to become unstable and accordingly such disadvantages as deterioration in emission properties and an increase in combustion noise occur. In this respect, with this structure, the exhaust-gas recirculation quantity can appropriately be adjusted according to the actual intake air quantity, so that such disadvantages in the transient operating state of the internal combustion engine can suitably be prevented from occurring.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
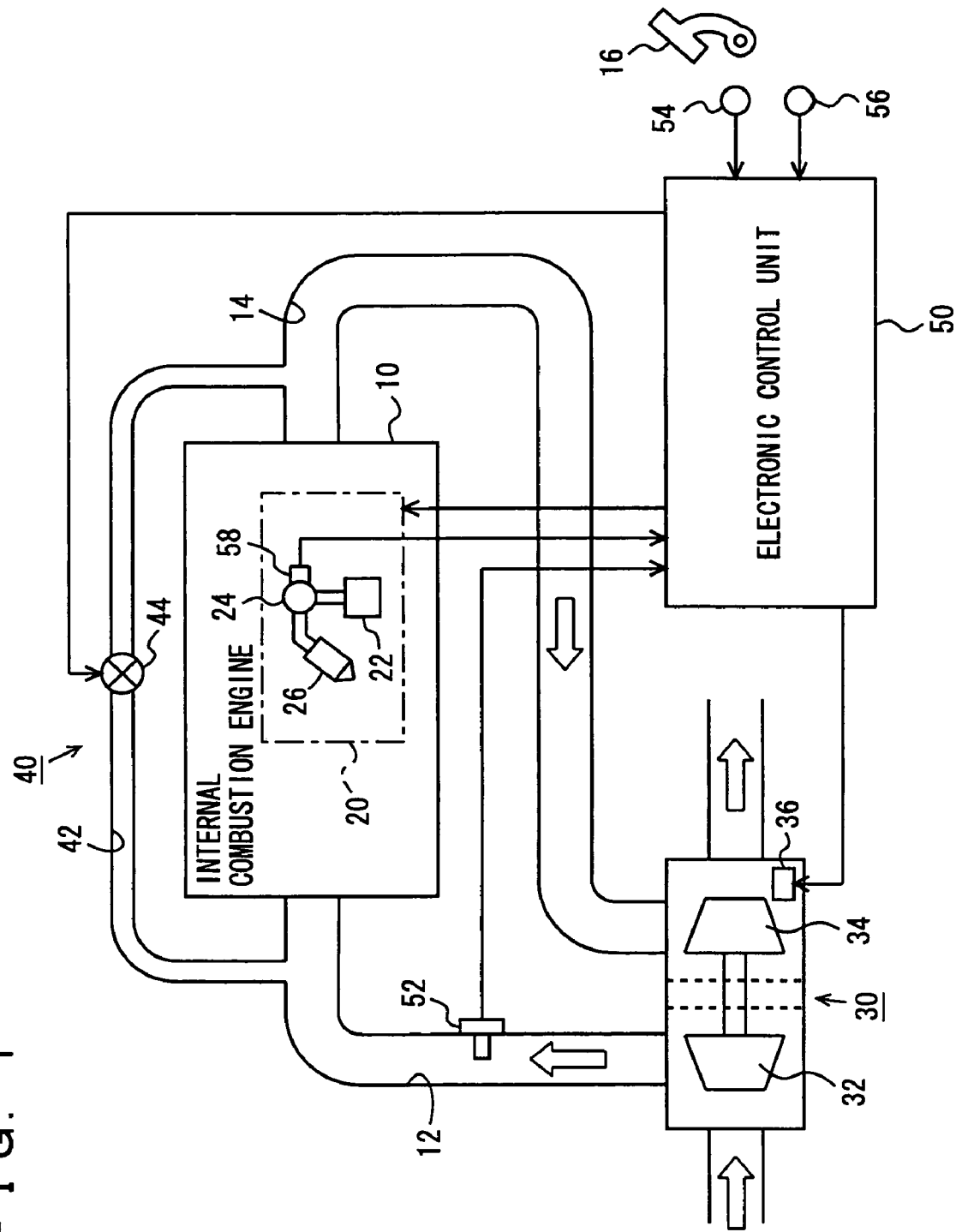
FIG. 1 a schematic structural diagram illustrating a general structure of an embodiment implementing a control apparatus for an internal combustion engine according to the present invention.

An embodiment implementing the present invention is hereinafter described. Referring first to FIG. 1, a description is given of a general structure of a control apparatus for an internal combustion engine in the present embodiment.

As shown in FIG. 1, internal combustion engine 10 has a fuel injection mechanism 20, and fuel injection mechanism 20 includes a fuel pump 22, an accumulator pipe 24 and a fuel injection valve 26. Fuel injection mechanism 20 stores fuel delivered from fuel pump 22 in accumulator pipe 24 while driving to open fuel injection valve 26 that communicates with accumulator pipe 24 and thereby injects to supply the fuel to internal combustion engine 10. The quantity of fuel to be injected is adjusted by adjusting the fuel pressure in accumulator pipe 24 (specifically adjusting the quantity of fuel delivered by fuel pump 22) and adjusting the valve opening period as well as the valve opening timing of fuel injection valve 26. It is noted that, for controlling the operation of fuel injection mechanism 20, any of the following manners of injection is selected as required. The injection manners include the manner of injection in which fuel of a quantity appropriate for the engine operating state is injected to be supplied all together by main injection and the manner of injection in which the fuel of the aforementioned quantity is injected to be supplied by fuel injection divided into main injection and its preceding pilot injection.

Internal combustion engine 10 also has an exhaust-driven turbocharger 30. Intake air flowing in an intake manifold 12 of internal combustion engine 10 is compressed by a compressor wheel 32 of turbocharger 30 and supplied to internal combustion engine 10. In internal combustion engine 10, an air-fuel mixture of this intake air and fuel is burned and the resultant exhaust is discharged to an exhaust manifold 14. The exhaust is blown against a turbine wheel 34 of turbocharger 30 to cause turbine wheel 34 as well as compressor wheel 32 coupled to turbine wheel 34 to spin. The exhaust passing through turbocharger 30 is discharged to the outside from exhaust manifold 14.

Turbocharger 30 includes a change mechanism 36 changing the pressure of the intake air supplied to internal combustion engine 10 by adjusting the rotational speed of compressor wheel 32. Change mechanism 36 has a nozzle vane not shown) for changing the effective area of the passage from exhaust manifold 14 to turbine wheel 34, and adjusts the degree of opening of the nozzle vane so as to adjust the quantity and speed of the exhaust flow blown against turbine wheel 34.

Internal combustion engine 10 further has an exhaust gas recirculation (EGR) mechanism 40, and EGR mechanism 40 includes an EGR manifold 42 and an EGR valve 44. EGR manifold 42 couples the downstream side of intake manifold 12 with respect to compressor wheel 32 and the upstream side of exhaust manifold 14 with respect to turbine wheel 34, and EGR valve 44 is provided at an appropriate position in EGR manifold 42. The degree of opening of EGR valve 44 is adjusted so as to adjust the quantity of exhaust (EGR quantity) that is re-circulated via exhaust manifold 14 to intake manifold 12.

An electronic control unit 50 performs centralized control for various controls of respective operations of fuel injection mechanism 20, change mechanism 36 and EGR mechanism 40 of internal combustion engine 10, and includes, in addition to a computation unit and a drive circuit, a memory device for example that stores computation results as well as function maps used in the computation for various controls.

Further, intake manifold 12 is provided with an intake air pressure sensor 52 for detecting an actual intake air pressure (actual intake air pressure P0). In the vicinity of an accelerator pedal 16, an accelerator pedal position sensor 54 is provided for detecting the press-down degree, namely the degree to which the accelerator pedal is depressed (accelerator press-down degree ACCP). Further, in the vicinity of a crankshaft (not shown) of internal combustion engine 10, a crankshaft position sensor 56 is provided for detecting the rotational speed of the crankshaft (engine speed NE). Accumulator pipe 24 is provided with a fuel pressure sensor 58 for detecting the fuel pressure Pf in the pipe. Electronic control unit 50 calculates, based on accelerator press-down degree ACCP and engine speed NE, a target control value of the quantity of injected fuel (target fuel injection quantity TQ). Further, electronic control unit 50 calculates each of the following target control values based on such engine parameters as target fuel injection quantity TQ and engine speed NE.

target control value of fuel pressure Pf of accumulator pipe 24 (target fuel pressure TPf)

target control value of the fuel injection timing of the main injection (target main injection timing TFm)

target control value of the fuel injection quantity of the pilot injection (target pilot injection quantity TFp)

target control value of the interval (pilot interval) at which the pilot injection and the main injection are performed (target pilot interval TFin)

target control value of actual intake air pressure P0 (target intake air pressure TP0)

target control value of the degree of opening of EGR valve 44 (target EGR opening degree Tegr)

Electronic control unit 50 outputs respective drive signals according to their associated target control values so as to control fuel injection mechanism 20, change mechanism 36 and EGR mechanism 40 so that an actual value is equal to each target control value.

When the operating state of internal combustion engine 10 in the steady operating state is changed, a resultant response delay of the intake air quantity causes the internal combustion engine to enter the transient operating state in which there is a difference between an intake air quantity appropriate for the operating state as changed and an actual intake air quantity. Then, after a predetermined period of time, the engine enters again the steady operating state. Further, since internal combustion engine 10 is provided with exhaust-driven turbocharger 30 adjusting the degree of supercharging, such a delay in operation of turbocharger 30 as so-called turbo lag is also a factor that causes the delay in change of the intake air quantity. Thus, regarding this internal combustion engine 10, the characteristic of the intake itself causes the delay in change of the intake air quantity and further the operational delay of turbocharger 30 causes the delay in change of the intake air quantity. As a result, the above-described difference increases between the intake air quantity appropriate for the operating state and the actual intake air quantity.

Therefore, in the transient operating state of internal combustion engine 10, if respective operations of fuel injection mechanism 20 and EGR mechanism 40 are controlled in the manner appropriate for the steady operating state of the engine, the control variables are not appropriate for the actual intake air quantity. Consequently, such various disadvantages as deterioration in emission properties and an increase in combustion noise are caused.

Under the circumstances, the present embodiment calculates, as described below, each target control value (hereinafter "S0") for controlling respective operations of fuel injection mechanism 20 and EGR mechanism 40.

Figure 2:
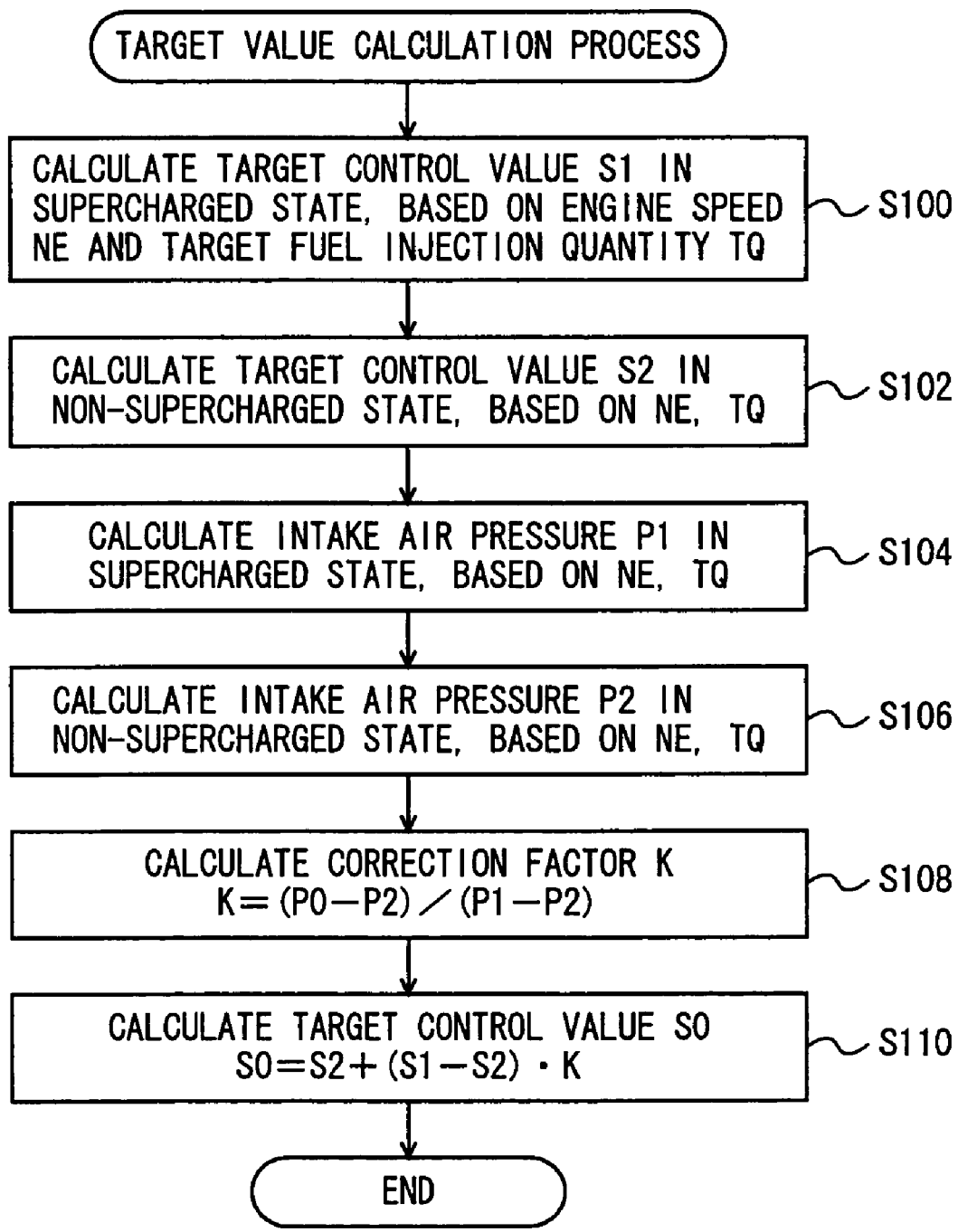
FIG. 2 is a flowchart illustrating a specific procedure of a process of calculating a target value.

FIG. 2 shows a flowchart illustrating a specific procedure of a process for calculating target control value S0 (target value calculation process). The series of process steps shown in the flowchart is performed at predetermined intervals by electronic control unit 50.

As shown in FIG. 2, in this process, a map calculation based on target fuel injection quantity TQ and engine speed NE is first performed to determine target control value S1 (for a supercharged state) where it is assumed that turbocharger 30 has its supercharging efficiency equal to a ratio appropriate for the engine operating state (S100). In the map used for this map calculation, a relation is determined and set, by means of experimental results for example, between an engine operating state determined by target fuel injection quantity TQ and engine speed NE and a target control value appropriate for the engine operating state, under the condition in the above-described supercharged state (specifically where target intake pressure TP0 and actual intake pressure P0 are equal to each other) and the condition that internal combustion engine 10 is in the steady operating state.

Further, a map calculation based on target fuel injection quantity TQ and engine speed NE is performed to determine target control value S2 (for a non-supercharged state) where it is supposed that turbocharger 30 does not perform supercharging (step S102). In the map used for this map calculation, a relation is determined and set, by means of experimental results for example, between an engine operating state determined by target fuel injection quantity TQ and engine speed NE and a target control value appropriate for the engine operating state, under the condition in the above-described non-supercharged state (specifically where the degree of opening of the nozzle vane as described above is the maximum degree of opening) and the condition that internal combustion engine 10 is in the steady operating state.

Then, a map calculation based on target fuel injection quantity TQ and engine speed NE is performed to determine intake air pressure P1 in the above-described supercharged state (step S104). In the map used for this map calculation, a relation is determined and set, by means of experimental results for example, that is a relation between an engine operating state determined by target fuel injection quantity TQ and engine speed NE and actual intake air pressure P0 in the engine operating state and that is a relation under the condition in the above-described supercharged state and the condition that internal combustion engine 10 is in the steady operating state.

Further, a map calculation based on target fuel injection quantity TQ and engine speed NE is performed to determine intake air pressure P2 in the above-described non-supercharged state (step S106). In the map used for this map calculation, a relation is determined and set, by means of experimental results for example, that is a relation between an engine operating state determined by target fuel injection quantity TQ and engine speed NE and actual intake air pressure P0 in the operating state and that is a relation under the condition in the above-described non-supercharged state and the condition where internal combustion engine 10 is in the steady operating state.

Furthermore, based on intake air pressures P1, P2 and actual intake air pressure P0 as described above, the following relational expression (1) is used to calculate correction factor K (step S108).

$$K = (P0 - P2)/(P1 - P2) \tag{1}$$

Thereafter, based on this correction factor K as well as target control values S1, S2 as described above, the following relational expression (2) is used to calculate target control value S0 (step S110).

$$S0 = S2 + (S1 - S2) \cdot K \tag{2}$$

Target control value S0 is thus calculated and thereafter this process is ended for the time.

It is noted that, in the present embodiment, steps S100, S102, S104, S106 of the target value calculation process function as estimation means, and steps S108, S110 thereof function as calculation means.

Figure 3:
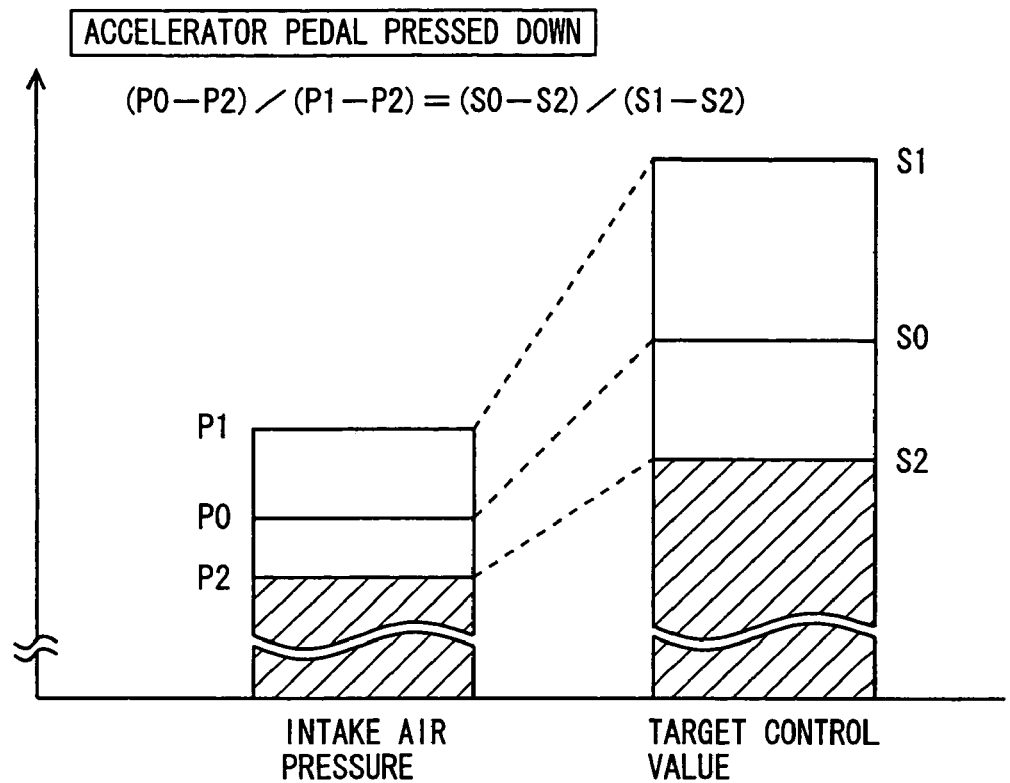
FIG. 3 illustrates in schematic form an exemplary relation between values used in the process of calculating a target value.
Figure 4:
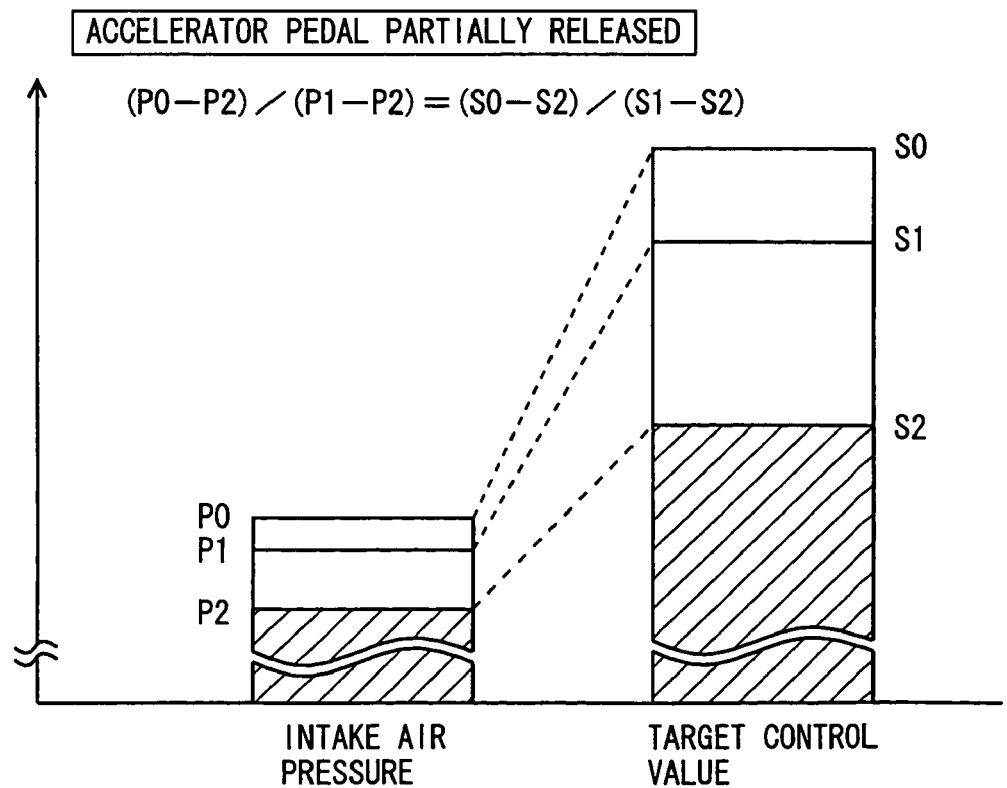
FIG. 4 illustrates in schematic form another exemplary relation between values used in the process of calculating a target value.

FIGS. 3 and 4 each show an exemplary relation between values used in the above-described process of calculating the target value. FIG. 3 shows the relation in the case where accelerator pedal 16 is pressed down, and FIG. 4 shows the relation in the case where accelerator pedal 16 is partially released.

For the target value calculation process in the preset embodiment, it is supposed that there are the two assumed states, namely the supercharged state and the non-supercharged state as described above. In order to calculate target control value S0, intake air pressures P1, P2 and target control values S1, S2 in respective assumed states are first calculated, based on such engine parameters as engine speed NE. Then, based on the relation between intake air pressures P1, P2 and actual intake air pressure P0, interpolation is performed on target control values S1, S2 to calculate target control value S0.

In other words, in the above-described target value calculation process, target control values S1, S2 (under the condition that internal combustion engine 10 is in the steady operating state) are corrected in the manner according to the difference between the intake air quantities appropriate for the engine parameters and the actual intake air quantity and according to the engine parameters, so as to calculate target control value S0.

Therefore, in the case where internal combustion engine 10 enters the transient operating state, target control value S0 can be calculated in the manner according to the difference between the target control values appropriate for the steady operating state and the target control value appropriate for the actual operating state, resultant from the above-described difference in intake air quantity. Accordingly, as compared with the structure calculating the target control value based on only the above-described difference in intake air quantity, target control value S0 can appropriately be adjusted.

Specifically, as target control value S0 as described above, a value that satisfies the following relational expression (3) is calculated, namely the value is calculated that allows the relation between intake air pressures P1, P2 and actual intake air pressure P0 to be identical to the relation between target control values S1, S2 and target control value S0.

$$(P0-P2)/(P1-P2)=(S0-S2)/(S1-S2) \quad (3)$$

In the target value calculation process as described above, the calculation of target control value S0 uses intake air pressure P1 and target control value S1 in the state (supercharged state as described above) where turbocharger 30 has its supercharging efficiency that is set to a ratio according to the engine operating state. Therefore, in the case where the supercharging efficiency increases to cause actual intake air pressure P0 to increase and internal combustion engine 10 changes from the transient operating state to the steady operating state to allow actual intake air pressure P0 to be equal to intake air pressure P1 which is appropriate for the engine operating state, target control value S0 is properly calculated in the manner according to the actual intake air quantity.

Further, in the target value calculation process as described above, the calculation of target control value S0 uses intake air pressure P2 and target control value S2 in the state (non-supercharged state as described above) where turbocharger 30 does not perform supercharging. Therefore, in the case where the supercharging efficiency decreases to cause actual intake air pressure P0 to decrease and internal combustion engine 10 changes from the transient operating state to the steady operating state to allow actual intake air pressure P0 to be equal to intake air pressure P2 which is associated with the state where turbocharger 30 does not perform the supercharging, target control value S0 is properly calculated in the manner according to the actual intake air quantity.

In the following, with reference to the timing charts in FIGS. 5 and 6, a manner in which target control value S0 is calculated in the target value calculation process is described.

Figure 5:
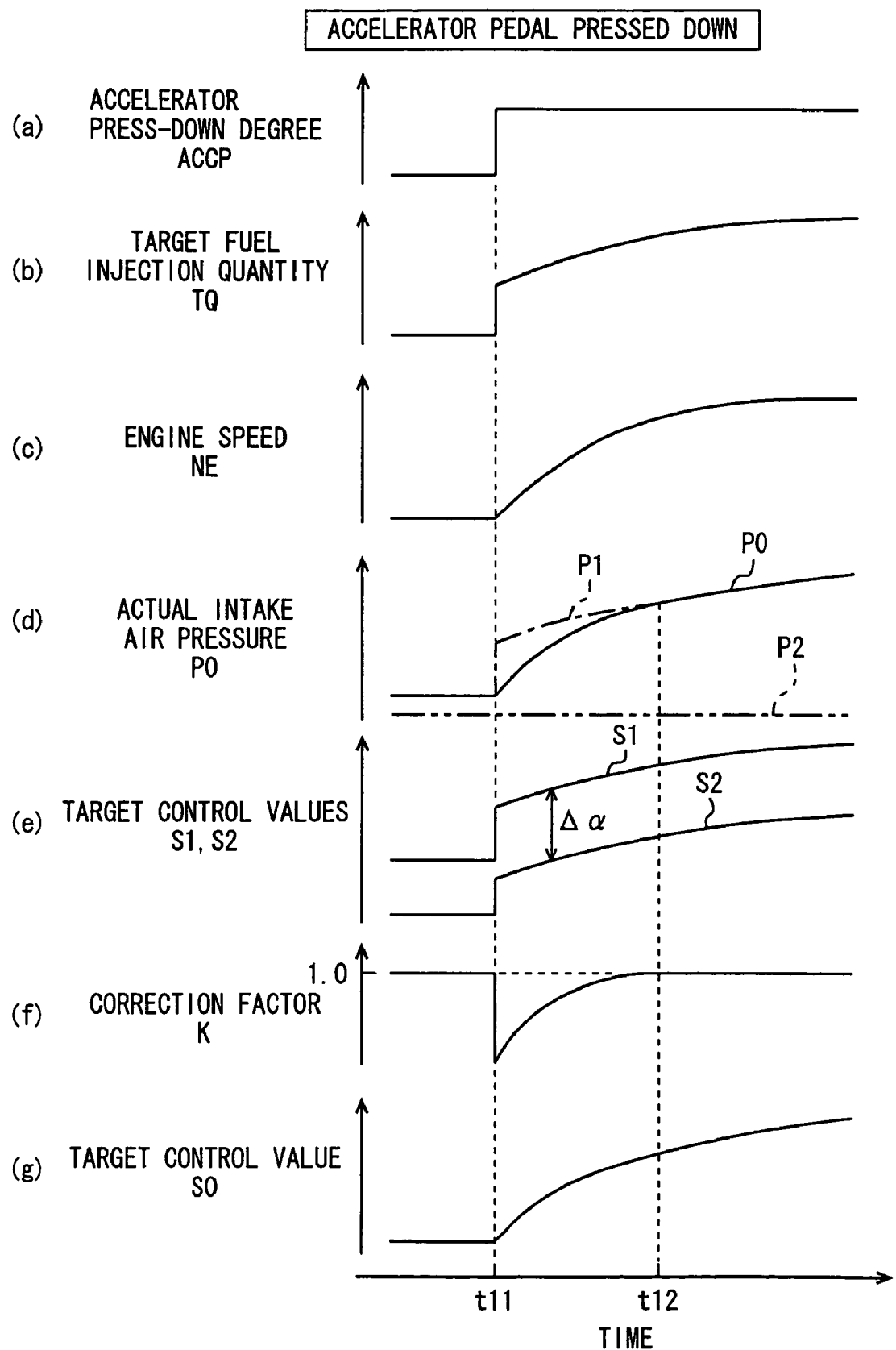
FIG. 5 is a timing chart illustrating an exemplary manner of the process of calculating a target value.
Figure 6:
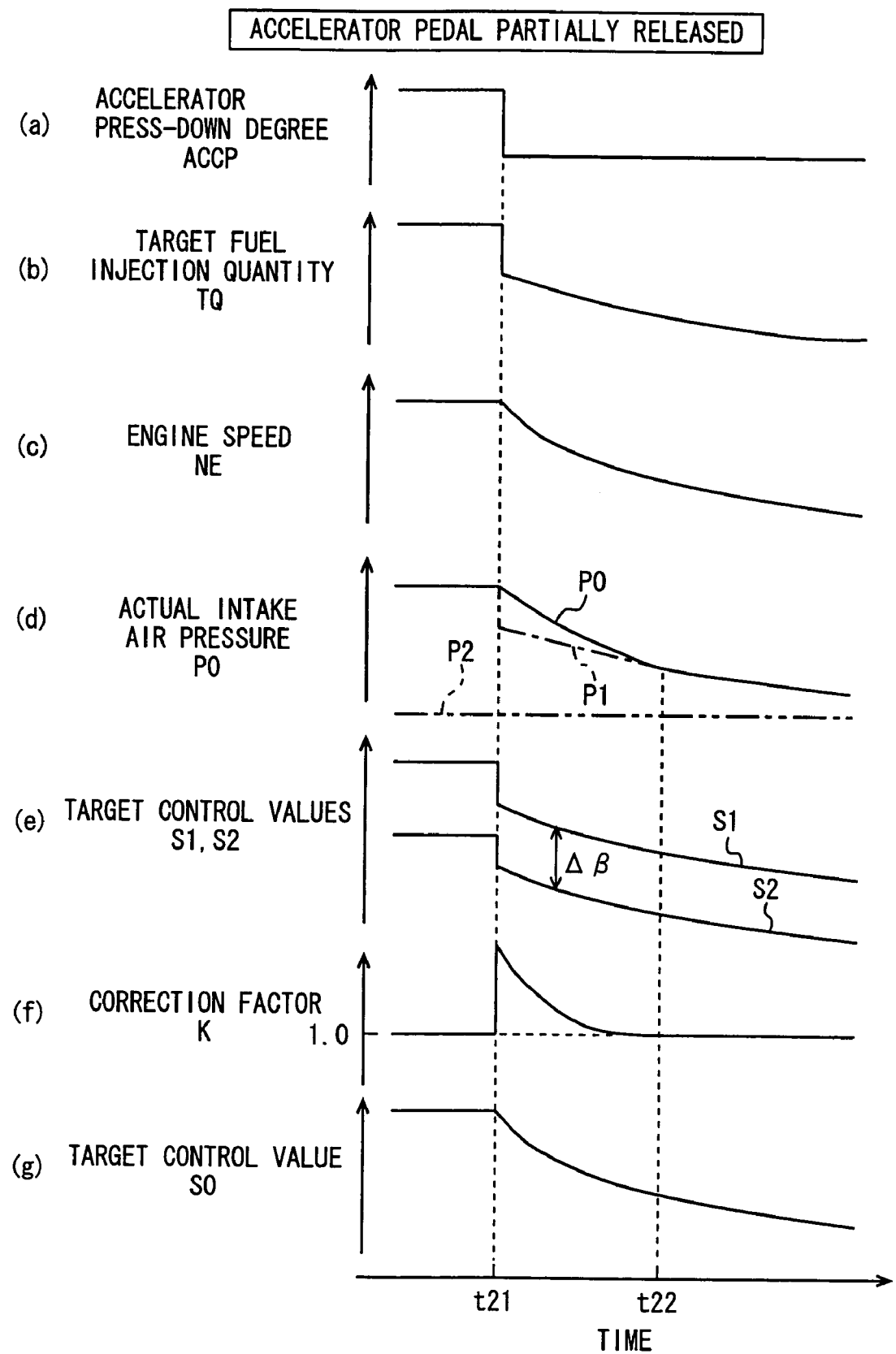
FIG. 6 is a timing chart illustrating another exemplary manner of the process of calculating the target value.

FIG. 5 illustrates an exemplary manner of the calculation of target control value S0 in the case where accelerator pedal 16 is pressed down, and FIG. 6 illustrates an exemplary manner of the calculation of target control value S0 in the case where accelerator pedal 16 is partially released, namely eased up.

Referring first to FIG. 5, a description is given of the manner of calculating target control value S0 in the case where accelerator pedal 16 is depressed.

As shown in FIG. 5, at time t11, accelerator pedal 16 ((a) in FIG. 5) is pressed down while internal combustion engine 10 is in the steady operating state. Accordingly, target fuel injection quantity TQ ((b) in FIG. 5) increases by the quantity according to the increase in degree to which the pedal is depressed. Further, target control values S1, S2 ((e) in FIG. 5) increase together by the quantity according to the increase in target fuel injection quantity TQ.

Accordingly, after time t11, engine speed NE ((c) in FIG. 5) gradually increases, and accordingly target fuel injection quantity TQ and target control values S1, S2 gradually increase.

At this time, with respect to the increase of target fuel injection quantity TQ, the increase of the intake air quantity and actual intake air pressure P0 ((d) in FIG. 5) is delayed. Therefore, in a predetermined period (from time t11 to time t12), internal combustion engine 10 operates in the transient operating state where there is a difference between actual intake air pressure P0 and intake air pressure P1 ((d) indicated by the chain line in FIG. 5) appropriate for engine speed NE and target fuel injection quantity TQ.

Thus, in the present embodiment, correction factor K ((f) in FIG. 5) is calculated that temporarily becomes a smaller value (<1) at time t11 and gradually approaches "1" to reach "1" at time t12, in this predetermined period. Then, difference Δα between target control values S1 and S2 is multiplied by this correction factor K and the resultant product is added to target control value S2 in the non-supercharged state, so as to calculate target control value S0 ((g) in FIG. 5) (see FIG. 3).

As seen from the above, in the case where accelerator pedal 16 is pressed down, target control value S0 is calculated, based on correction factor K that is calculated from the relation between intake air pressures P1, P2 ((d) indicated by the chain line in FIG. 5) and actual intake air pressure P0 and based on target control values S1, S2, in the manner according to the change of the actual intake air quantity. Thus, as compared with the structure that calculates the target control value based on only the difference between the actual intake air quantity and the intake air quantity appropriate for accelerator press-down degree ACCP and engine speed NE and that does not use intake air pressure P2 and target control value S2 as described above, the operation of each of mechanisms 20, 40 when engine 10 is accelerated is controlled in the manner according to the change of the actual intake air quantity.

Referring next to FIG. 6, a description is given of the manner of calculating target control value S0 in the case where accelerator pedal 16 is partially released.

As shown in FIG. 6, at time t21, accelerator pedal 16 ((a) in FIG. 6) is partially released while internal combustion engine 10 is in the steady operating state. Accordingly, target fuel injection quantity TQ ((b) in FIG. 6) decreases by the quantity according to the decrease in degree to which the pedal is depressed. Further, target control values S1, S2 ((e) in FIG. 6) decrease together by the quantity according to the decrease in target fuel injection quantity TQ.

Accordingly, after time t21, engine speed NE ((c) in FIG. 6) gradually decreases, and accordingly target fuel injection quantity TQ and target control values S1, S2 gradually decrease.

At this time, with respect to the decrease of target fuel injection quantity TQ, the decrease of the intake air quantity and actual intake air pressure P0 ((d) in FIG. 6) is delayed. Therefore, in a predetermined period (from time t21 to time t22), internal combustion engine 10 operates in the transient operating state where there is a difference between actual intake air pressure P0 and intake air pressure P1 ((d) indicated by the chain line in FIG. 6) appropriate for engine speed NE and target fuel injection quantity TQ.

In the present embodiment, correction factor K ((f) in FIG. 6) is calculated that temporarily becomes a larger value (>1) at time t21 and gradually approaches "1" to reach "1" at time t22, in the predetermined period. Then, in a similar manner to the one for the acceleration, difference Δβ between target control values S1 and S2 is multiplied by this correction factor K and the resultant product is added to target control value S2 in the non-supercharged state, so as to calculate target control value S0 ((g) in FIG. 6) (see FIG. 4).

As seen from the above, in the case where accelerator pedal 16 is partially released, target control value S0 is calculated as well, based on correction factor K that is calculated from the relation between intake air pressures P1, P2 ((d) indicated by the chain line in FIG. 6) and actual intake air pressure P0 and based on target control values. S1, S2, so that target control value S0 is determined in the manner according to the change of the actual intake air quantity. Thus, as compared with the structure that calculates target control value S0 based on only the difference between the actual intake air quantity and the intake air quantity appropriate for accelerator press-down degree ACCP and engine speed NE and that does not use intake air pressure P2 and target control value S2 as described above, the operation of each of mechanisms 20, 40 is controlled in the manner according to the change of the actual intake air quantity.

Functions of the calculation of each target control value by the target value calculation process are hereinafter described for each target value.

As to "target fuel pressure TPf":

While internal combustion engine 10 is in the transient operating state, if fuel pressure Pf of accumulator pipe 24 deviates from the pressure appropriate for the current conditions, the fuel injection quantity is changed to cause such disadvantages as deterioration in emission properties and an increase in combustion noise. In contrast, the present embodiment uses the target value calculation process to calculate, as target fuel pressure TPf, the value according to the actual intake air quantity, so that actual fuel pressure Pf can appropriately be adjusted and the disadvantages can suitably be prevented from occurring.

As to "target main injection timing TFm":

While internal combustion engine 10 is in the transient operating state, if the fuel injection timing deviates from the timing appropriate for the current conditions, such disadvantages could occur as deterioration in emission properties due to unstable combustion of the air-fuel mixture as well as an increase in combustion noise due to an excessively high combustion rate. In contrast, the present embodiment uses the target value calculation process to calculate, as target main injection timing TFm, the value according to the actual intake air quantity, so that the fuel injection timing can appropriately be adjusted and the disadvantages can suitably be prevented from occurring.

As to "target pilot injection quantity TFp":

While internal combustion engine 10 is in the transient operating state, if the fuel injection quantity of the pilot injection deviates from the quantity appropriate for the current conditions, the combustion becomes unstable and such disadvantages as deterioration in emission properties and an increase in combustion noise could occur. In contrast, the present embodiment uses the target value calculation process to calculate, as target pilot injection quantity TFp, the value according to the actual intake air quantity, so that the fuel injection quantity of the pilot injection can appropriately be adjusted and the above-described disadvantages can suitably be prevented from occurring.

As to "target pilot interval TFin":

While internal combustion engine 10 is in the transient operating state, if the pilot interval as described above deviates from the interval appropriate for the current conditions, such disadvantages occur as deterioration in emission properties due to unstable combustion as well as an increase in combustion noise due to an excessively high combustion rate. In contrast, the present embodiment uses the target value calculation process to calculate, as target pilot interval TFin, the value according to the actual intake air quantity, so that the pilot interval can appropriately be adjusted and the disadvantage as described above can suitably be prevented from occurring.

As to "target EGR opening degree Tegr":

While internal combustion engine 10 is in the transient operating state, if the EGR value deviates from the value appropriate for the current conditions, the intake air quantity changes to cause combustion to become unstable and such disadvantages as deterioration in emission properties and an increase in combustion noise occur. In contrast, the present embodiment uses the target value calculation process to calculate, as target EGR opening degree Tegr, the value according to the actual intake air quantity, so that the EGR value can appropriately be adjusted and the disadvantages as described above can suitably be prevented from occurring.

As described above, according to the present embodiment, the effects as described below are obtained.

(1) The operations of fuel injection mechanism 20 and EGR mechanism 40 can be controlled appropriately in the manner according to the actual intake air quantity.

(2) For calculating target control value S0, intake air pressure P1 and target control value S1 in the supercharged state as described above are used. Therefore, in the case where turbocharger 30 increases in supercharging efficiency to accordingly increase actual intake air pressure P0 and internal combustion engine 10 changes from the transient operating state to the steady operating state to accordingly allow actual intake air pressure P0 to be equal to intake air pressure P1 appropriate for the engine operating state, target control value S0 can appropriately be calculated in the manner according to the actual intake air quantity.

(3) Intake air pressure P2 and target control value S2 in the non-supercharged state as described above are used to calculate target control value S0. Therefore, in the case where turbocharger 30 decreases in supercharging efficiency to accordingly decrease actual intake air pressure P0 and internal combustion engine 10 changes from the transient operating state to the steady operating state to accordingly allow actual intake air pressure P0 to be equal to intake air pressure P2 corresponding to the state where turbocharger 30 does not perform supercharging, target control value S0 can appropriately be calculated in the manner according to the actual intake air quantity.

(4) Each of the target control values (target fuel pressure TPf, target main injection timing TFm, target pilot injection quantity TFp, target pilot interval TFin, target EGR opening degree Tegr) can be calculated in the manner according to the actual intake air quantity, and deterioration in emission properties and an increase in combustion noise while internal combustion engine 10 is in the transient operating state can appropriately be prevented.

It is noted that the above-described embodiment may be implemented by being modified as described below.

The methods of calculating correction factor K and target control value S0 are not limited to those using relational expressions (1), (2) as described above and the methods may arbitrarily be changed on the condition that the calculation method provides target control value S0 calculated to satisfy the relational expression: "(P0−P2)/(P1−P2)=(S0−S2)/(S1−S2)." For example, correction factor Ka may be calculated by the relational expression: "Ka=(P1−P0)/(P1−P2)" to calculate target control value S0 by the relational expression: "S0=S1−(S1−S2)·Ka." Further, correction factor Kb may be calculated by the relational expression: "Kb=(P1−P2)/(P0−P2)" to calculate target control value S0 by the relational expression: "S0=S2+(S1−S2)/Kb."

Furthermore, the relational expression: "S0=S2+(S1−S2)·α·K" may be used to calculate target control value S0. Specifically, correction factors K, Ka, Kb as described above may be multiplied by a predetermined factor α to use the resultant values ("α·K," "α·Ka," "α·Kb") for calculating target control value S0. This structure may use, as predetermined factor α as described above, a predetermined fixed value or any variable value that is calculated based on engine parameters and correction factor for example.

A target value of the ratio of an EGR gas to the air-fuel mixture (target EGR ratio) may be calculated based on engine speed NE and target fuel injection quantity TQ to control the operation of EGR mechanism 40 according to this target EGR ratio. In this case, the target value calculation process may be used to calculate the target EGR ratio.

In the embodiment as described above, the target value calculation process is used to calculate target fuel pressure TPf, target main injection timing TFm, target pilot injection quantity TFp, target pilot interval TFin, and target EGR opening degree Tegr. However, one or some of the target values may be calculated.

On the condition that the target control value is calculated based on engine speed NE and target fuel injection quantity TQ, a target control value of any operational mechanism except for fuel injection mechanism 20 and EGR mechanism 40 may be calculated using the above-described target value calculation process. The operational mechanism may include for example fuel vapor processing mechanism discharging fuel vapor in the fuel tank to the intake manifold, blowby gas processing mechanism and variable valve timing mechanism.

Further, on the condition that the target control value is calculated based on any engine parameters except for the actual intake air quantity, for example, on the condition that a target control value is calculated based on engine speed NE only, the target control value may be calculated through any process based on the target value calculation process as described above, so that the functions and effects similar to those of the embodiment as described above can be obtained.

The present invention is applicable to an internal combustion engine having a turbocharger of fixed capacity without the change mechanism for changing the intake air pressure. In this case, for an internal combustion engine having a bypass passage provided in the engine exhaust passage and bypassing the turbine wheel and having a waist gate valve for making a switch between closing and opening of the passage, the non-supercharged state may be the state in which this valve is opened.

As the intake air pressure in the non-supercharged state, the atmospheric pressure may be used. As this atmospheric pressure, an actually measured value or a value stored in advance in electronic control unit 50 may be used.

Instead of using intake air pressure P1 and target control value S1 in the supercharged state for calculating target control value S0, an intake air pressure and a target control value may be used in the state where turbocharger 30 has its supercharging efficiency equal to an arbitrarily-determined first predetermined ratio. Further, instead of using intake air pressure P2 and target control value S2 in the non-supercharged state for calculating target control value S0, an intake air pressure and a target control value may be used in the state where turbocharger 30 has its supercharging efficiency equal to an arbitrarily-determined second predetermined ratio (different from the first predetermined ratio). This structure may also be used to set two assumed states different from each other and different in supercharging efficiency of the turbocharger, estimate, on the basis of engine parameters, intake air pressures and target control values in the assumed states, and perform interpolation on the target control values that are also estimated on the basis of the relation between the estimated intake air pressures and the actual intake air pressure, so that target control value S0 can be calculated.

Instead of the intake air pressure and the actual intake air pressure, such values that change in relation to the intake air pressure as the intake air quantity and the actual intake air quantity (intake-air-pressure index value and actual intake-air-pressure index value) may be used to calculate target control value S0.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine, comprising:
an estimation unit estimating, based on engine parameters, an intake-air-pressure index value and an engine control variable under the condition that the internal combustion engine is in a steady operating state and the condition that an exhaust-driven turbocharger has its supercharging efficiency equal to a first predetermined ratio and estimating, based on the engine parameters, an intake-air-pressure index value and an engine control variable under the condition that said internal combustion engine is in the steady operating state and the condition that said exhaust-driven turbocharger has its supercharging efficiency equal to a second predetermined ratio;

a detection unit detecting an actual intake-air-pressure index value; and a calculation unit calculating an engine control variable associated with said actual intake-air-pressure index value under the condition that said internal combustion engine is in a transient operating state, by performing interpolation on said engine control variables, based on a relation between said intake-air-pressure index values each as estimated and said actual intake-air-pressure index value as detected.

2. The control apparatus for the internal combustion engine according to claim 1, wherein said condition that said supercharging efficiency is equal to the first predetermined ratio refers to the condition that said supercharging efficiency is set to a ratio according to an engine operating state.

3. The control apparatus for the internal combustion engine according to claim 1, wherein said condition that said supercharging efficiency is equal to the second predetermined ratio refers to the condition without supercharging by said exhaust-driven turbocharger.

4. The control apparatus for the internal combustion engine according to claim 1, wherein said calculation unit calculates an engine control variable $S0$ that satisfies the relational expressions:

$$S0 = S2 + (S1 - S2) \cdot \alpha \cdot K$$

$$K = (P0 - P2)/(P1 - P2)$$

where "P1" and "S1" are the intake-air-pressure index value and the engine control variable respectively under the condition that said supercharging efficiency is equal to the first predetermined ratio, "P2" and "S2" are the intake-air-pressure index value and the engine control variable respectively under the condition that said supercharging efficiency is equal to the second predetermined ratio, "P0" is said actual intake-air-pressure index value, "S0" is the engine control variable under the condition that said internal combustion engine is in the transient operating state, and "α" is a predetermined factor.

5. The control apparatus for the internal combustion engine according to claim 1, wherein said calculation unit calculates an engine control variable $S0$ that satisfies the relational expression:

$$(P0-P2)/(P1-P2) = (S0-S2)/(S1-S2)$$

where "P1" and "S1" are the intake-air-pressure index value and the engine control variable respectively under the condition that said supercharging efficiency is equal to the first predetermined ratio, "P2" and "S2" are the intake-air-pressure index value and the engine control variable respectively under the condition that said supercharging efficiency is equal to the second predetermined ratio, "P0" is said actual intake-air-pressure index value, "S0" is the engine control variable under the condition that said internal combustion engine is in the transient operating state.

6. The control apparatus for the internal combustion engine according to claim 1, further comprising a fuel injection mechanism injecting fuel from a fuel injection valve connected to an accumulator pipe while adjusting a fuel pressure in the accumulator pipe, wherein said engine control variable is said fuel pressure.

7. The control apparatus for the internal combustion engine according to claim 1, further comprising a fuel injection mechanism performing fuel injection divided into main injection and its preceding pilot injection, wherein said engine control variable is an interval at which said pilot injection and said main injection are performed.

8. The control apparatus for the internal combustion engine according to claim 1, further comprising a fuel injection mechanism performing fuel injection divided into main injection and its preceding pilot injection, wherein said engine control variable is a fuel injection quantity in said pilot injection.

9. The control apparatus for the internal combustion engine according to claim 1, wherein said engine control variable is a fuel injection timing of said internal combustion engine.

10. The control apparatus for the internal combustion engine according to claim 1, further comprising an exhaust gas recirculation mechanism recirculating exhaust gas in an engine exhaust manifold to an engine intake manifold while adjusting the quantity of the exhaust gas, wherein said engine control variable is a quantity of the recirculated exhaust gas.

* * * * *